United States Patent
Inomata et al.

[11] 3,857,902
[45] Dec. 31, 1974

[54] PURIFICATION OF TURPENTINE BY A PROCESS FOR THE RECOVERY OF ONE OR MORE DISSOLVED PRODUCTS FROM COMPLEX LIQUID MIXTURES

[75] Inventors: Mamoru Inomata; Kazuo Hanabusa, both of Kobe, Japan

[73] Assignee: L'Air Liquide, Societe Anonyme Pour L'Etude et L'Exploitation Des Procedes Georges Claude, Paris, France

[22] Filed: Dec. 8, 1972

[21] Appl. No.: 313,395

[30] Foreign Application Priority Data
Dec. 31, 1971 Japan.............................. 46-06784

[52] U.S. Cl................ 260/675.5, 62/27, 203/49, 203/50, 208/356
[51] Int. Cl...................... C07c 13/00, C07c 27/02
[58] Field of Search ......... 260/675.5; 55/47, 51, 73; 208/356; 203/49, 50; 62/27

[56] References Cited
UNITED STATES PATENTS

| | | | |
|---|---|---|---|
| 1,493,454 | 5/1924 | Jobson................................. 203/31 |
| 2,283,067 | 5/1942 | Jennings.......................... 260/675.5 |
| 2,409,614 | 10/1946 | Collins............................. 260/675.5 |
| 3,387,431 | 6/1968 | Siebert.................................... 55/51 |
| 3,660,512 | 5/1972 | Hamby et al. .................. 260/675.5 |
| 3,778,486 | 12/1973 | Hamby............................. 260/675.5 |

Primary Examiner—Delbert E. Gantz
Assistant Examiner—G. E. Schmitkons
Attorney, Agent, or Firm—Browdy and Neimark

[57] ABSTRACT

A process is disclosed whereby one or more dissolved products can be extracted from complex liquid mixtures containing two or more products, the boiling point of one or more of said products being substantially higher than the boiling point of at least one of the other products. According to the process the complex liquid mixture is contacted with a gas whose boiling point is substantially lower than that of the product to be extracted in a manner such that the product to be extracted is entrained by the gas and can subsequently be separated from the gas, for example by condensation effected by cooling, the remainder of the complex liquid mixture, from which the extracted product has been removed, being supplied if required to a further processing stage. The process is especially applicable to the treatment of crude oils obtained from the digestion of cellulosic pulps.

8 Claims, 1 Drawing Figure

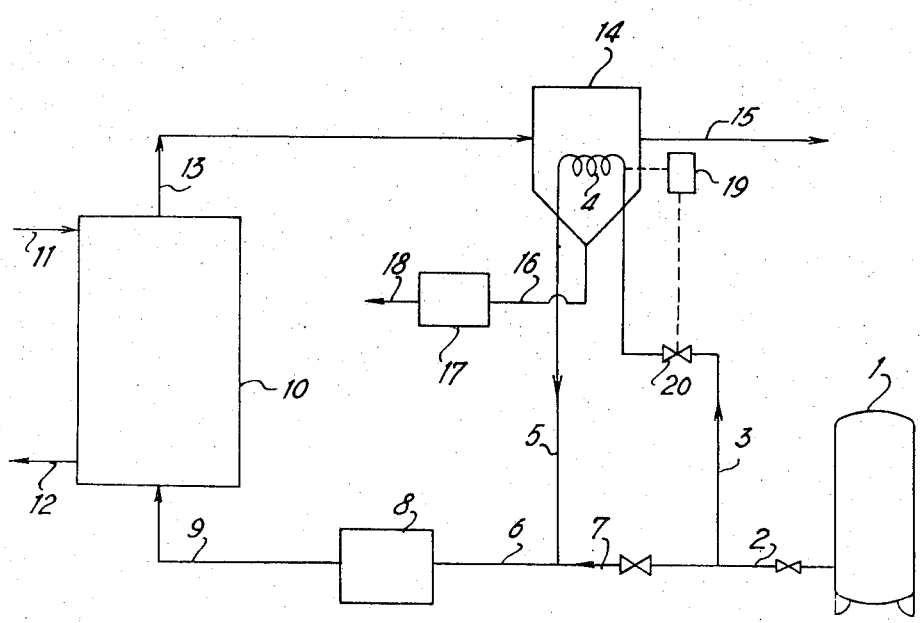

3,857,902

PURIFICATION OF TURPENTINE BY A PROCESS FOR THE RECOVERY OF ONE OR MORE DISSOLVED PRODUCTS FROM COMPLEX LIQUID MIXTURES

BACKGROUND OF THE INVENTION

This invention relates to the extraction of one or more dissolved products from complex liquid mixtures containing two or more products, the boiling point of one or more of said products being substantially higher than the boiling point of at least one of the other products.

Such complex liquid mixtures may be of widely varying origin; for example, they may be crude products or the reaction subproducts of a chemical conversion or synthesis process in which there are dissolved on the one hand industrially utilizable products, the recovery of which is desired, and on the other hand harmful or valueless products requiring to be eliminated. The extraction of said harmful or valueless products from complex liquid mixtures containing them is frequently effected through the intermediary of a purely chemical reaction, such as oxidation, and this involves the risk of modification and degradation of some useful products and renders difficult the elimination of the harmful or valueless products alone.

It is an object of the present invention to provide a process which palliates these disadvantages and permits the elimination of the harmful or valueless product contained in a complex liquid mixture and the recovery of the industrially utilizable elements without degradation of their chemical structure.

SUMMARY OF THE INVENTION

According to the present invention there is provided a process for the extraction of a dissolved product from a complex liquid mixture containing at least two products, the boiling point of one of said two products being substantially higher than the boiling point of the other of said two products, which process comprises contacting said complex liquid mixture with a gas, the boiling point of which is substantially lower than that of the product to be extracted, in such manner that the product to be extracted is entrained by said gas and is thereby removed from the complex liquid mixture. Throughout the present specification the term "extraction" is intended to mean removal by selective volatilization via entrainment in a carrier gas, viz., gaseous nitrogen.

Generally, the product to be extracted will be an impurity which is present in the complex liquid mixture in a minor amount. The process of the invention is particularly useful when the product to be extracted has a boiling point which is low relative to the other products in said complex liquid mixture, although high relative to said gas. Thus, it is advantageous if the boiling point of the product to be extracted is at least 50°C, and preferably at least 100°C, lower than the boiling point of the remainder of the complex liquid mixture. Similarly, it is advantageous if the gas employed to entrain the product to be extracted has a boiling point which is at least 50°C, and preferably at least 100°C lower than the boiling point of the product to be extracted.

The complex liquid mixture, after extraction of the product to be extracted can be subjected to a refining process, e.g. by separation, whereby individual constituents thereof which are industrially useful can be obtained.

The boiling point of the gas utilized for entraining one or more of the dissolved products in the complex liquid mixture, which products may be industrially utilizable materials or impurities, must be low relative to the boiling point of said dissolved product(s).

DESCRIPTION OF THE PREFERRED EMBODIMENTS

The crude oils derived from the digestion of cellulosic pulps are examples of the complex liquid mixtures which can with advantage be treated by the process according to the present invention. In one stage of the manufacture of chemical or semi-chemical pulps by the digestion of wood chips, the vapor coming from the digester is cooled with the resultant condensation and separation of a crude oil containing turpentine essence, pine oil, etc. (7.5 to 38 liters per ton of pulp). The composition and some of the properties of the constituents of this crude oil are as follows:

|  | Turpentine | Pine oil | Methyl mercaptan | Caffeine |
|---|---|---|---|---|
| Quantity | 50–60% | 20–10% | trace | trace |
| Melting point °C | — | 30–40 | −121° | — |
| Boiling point °C | 150°–180° | 250° | 6° | — |
| Composition | pinene dipentene (diamylene) | palmitic acid oleic acid | | — |

This crude oil contains, as an undesirable impurity, methyl mercaptan which is extremely malodorous and which it is necessary to eliminate, even if it is present only in a trace amount. The elimination of such impurities is generally effected by chlorine dioxide oxidation but this treatment results in the oxidation of the useful elements such as turpentine essence, for example, and this means that it is in practice difficult to eliminate only the impurities.

The process of the present invention enables this disadvantage to be overcome and makes it possible to eliminate solely the harmful impurities contained in the crude oil and to recover the industrially utilizable elements. For example, methyl mercaptan, the boiling point of which is 6°C, exists in the gaseous state dissolved in the crude oil. By contacting the said crude oil with an inert gas, the boiling point of which is substantially lower than that of methyl mercaptan and which exerts no action on the useful materials of which the oil is composed, the impurities are entrained by the inert gas and eliminated from the crude oil. Then, by cooling the inert gas after it has been contacted with the crude oil and has entrained the impurities, only the impurities which have a high boiling point relative to the gas condense, thus facilitating the separation thereof.

When processing a crude oil obtained from the digestion of wood pulps, it is advantageous to utilize nitrogen as the inert gas and to make use of the cold of liquid nitrogen for the condensation of the impurities entrained in the gas which have a high boiling point relative to said gas.

The process of the invention is also applicable to the treatment of turpentine extracted from conifers, notably pines, for the purpose of separating the turpentine from colophony.

The process of the invention permits the extraction of useful products or impurities which are present in a complex liquid mixture as trace with yields which may attain at least 25%.

According to one embodiment of the invention the inert gas utilized for extraction, after the separation therefrom of the extracted product, is recycled, optionally after liquefaction at low temperature.

The process of the invention may be carried into effect in various types of installation, but one particularly useful installation which constitutes another feature of the present invention comprises a reservoir for liquefied inert gas at low temperature; a vaporizer for said gas; a gas/liquid contacting means for bringing into mutual contact the inert, vaporized gas and a complex liquid mixture to be treated; a condenser for the condensation and separation from the inert gas, after the latter has passed through said gas/liquid contacting device, of the product extracted from the complex liquid mixture; means for liquefying the separated inert gas; and a conduit system via which the separated and liquefied, inert gas at low temperature is, after indirect heat exchange with the inert gas containing the extracted product, recycled to the vaporizer.

For a better understanding of the invention, and to show how the same may be carried into effect, reference will now be made, by way of example, to the accompanying drawing which shows diagrammatically one embodiment of an installation suitable for carrying out the process of the invention.

The installation has been designed for the treatment of the crude oil obtained from the digestion of cellulosic pulps. Nitrogen is employed as the inert gas and the frigories of the liquefied nitrogen are employed for effecting condensation of the product to be extracted, in this case the impurities entrained in said gas.

Liquid nitrogen is taken off from a reservoir 1 and is passed through conduit systems 2 and 3 and enters a coil 4 of a condenser 14 where it is partially vaporised by heat exchange with gaseous nitrogen containing the impurities. Then, the liquid nitrogen circulates in conduits 5 and 6 and enters a vaporizer 8 where it is completely vaporised. The gaseous nitrogen thus produced is at ambient temperature and is supplied to the lower portion of a gas/liquid contacting tower 10 through a conduit 9. The tower 10 contains therein perforated plates or lining elements which thus permit good contact between the crude oil arriving at the upper section thereof via a conduit 11 and the gaseous nitrogen supplied at the base thereof via conduit 9.

Instead of the tower 10, it is possible to use a reservoir in which the crude oil is stored and to inject nitrogen in fine bubbles via a porous device, such as a porous plug or stopper disposed in the base of the reservoir.

When the crude oil is contacted with the gaseous nitrogen, the impurities, such as methyl mercaptan, are entrained by the gaseous nitrogen and leave the tower through a conduit 13, whereas the oil from which the impurities have been removed exits through a conduit 12. The gaseous nitrogen charged with impurities (which mixture leaves the tower 10 through the conduit 13) is supplied to the condenser 14 where it is cooled by indirect heat exchange with the liquid nitrogen circulating in the coil 4. The impurities, having a boiling point substantially higher than nitrogen (the boiling point of methyl mercaptan is 6°C), are condensed and deposited in liquid form in the bottom of the condenser 14. The liquid impurities flow through a conduit 16 into an oxidation chamber 17, where they are treated with an oxidant, for example chlorine dioxide. Thus, the malodorous methyl mercaptan leaves the process via the conduit 18 in the form of non-odorous oxide, whereas the gaseous nitrogen from which the gaseous high boiling point subproduct has been removed is evacuated to the open air through a conduit 15 or is reliquefied and recycled. In order to make it possible to maintain the internal temperature of the condenser 14 at a sufficiently low level for complete condensation of the high boiling point impure gases, the inflow of liquid nitrogen in the coil 4 is controlled by a valve 20 which closes when the temperature within the condenser 14 drops to a pre-determined value and opens when it rises above said temperature. A conduit 7 is a bypass for supplying liquid nitrogen directly to the vaporizer 8 without passing through the coil 4.

We claim:

1. In a physical process for removing a soluble constituent from a liquid feed stock by selective volatilization and entrainment of said constituent in a stripping gas, which process comprises:
   a. providing a complex liquid mixture as said liquid feed stock, said complex liquid mixture comprising at least a major constituent and a minor constituent in lesser amount than said major constituent, said minor constituent being dissolved in said complex liquid mixture, and having a boiling point substantially lower than the boiling point of said major constituent, and substantially higher than the boiling point of nitrogen;
   b. providing gaseous nitrogen as said stripping gas, said nitrogen being inert with respect to at least said major constituent; and
   c. directly contacting at ambient temperature said liquid feed stock with said stripping gas, and obtaining thereby a waste stripping gas having selectively volatilized and entrained at least a part of said dissolved minor constituent, and a stripped liquid feed stock from which said minor constituent has been at least partly selectively removed, the improvement comprising:
   d. providing a source of liquid nitrogen;
   e. at least partially vaporizing a stream of said liquid nitrogen, in indirect heat exchange with said waste stripping gas containing at least a part of said minor constituent;
   f. using the vaporized part of said stream of liquid nitrogen, obtained during step (e), reheated to ambient temperature, as at least a part of said stripping gas involved in steps (b) and (c);
   g. condensing said part of said minor constituent contained in said waste strippng gas, in indirect heat exchange with said stream of liquid nitrogen in the course of the partial vaporization of step (e); and
   h. separating said condensed part of said minor constituent, obtained during step (g), from said waste stripping gas denuded from said selectively entrained and volatilized minor constituent.

2. A process according to claim 1, wherein said condensed part of said minor constituent, separated during step (h), is further processed.

3. A process according to claim 1, wherein said stream of liquid nitrogen is partially vaporized during step (e), is subsequently totally vaporized in another step distinct from step (e), and is finally used in totality as said stripping gas involved in steps (b) and (c).

4. A process according to claim 1, wherein the flowrate of said stream of liquid nitrogen during step (e) is controlled as a function of the condensing temperature of said part of said minor constituent during step (g).

5. A proces according to claim 1, wherein said waste stripping gas denuded from said minor constituent, separated during step (h), is recycled to a liquefaction step, and then into the process, in liquid form, as at least a part of said source of liquid nitrogen involved in step (d).

6. A process according to claim 1, wherein said complex liquid mixture comprises crude oil obtained from the digestion of cellulosic pulps, said major constituent comprises turpentine and pine oil and said minor constituent comprises methyl mercaptan dissolved in said crude oil.

7. A process for selectively removing soluble methyl mercaptan from crude oil, obtained from the digestion of cellulosic pulps, by selective volatilization and entrainment of said methyl mercaptan in gaseous nitrogen at ambient temperature, said crude oil comprising turpentine and pine oil as major constituents, and said methyl mercaptan as a minor constituent in lesser amount than said major constituents, dissolved in said crude oil, which process consists essentially of the steps of:

a. directly contacting at ambient temperature said crude oil with said gaseous nitrogen, and obtaining thereby waste gaseous nitrogen having selectively volatilized and entrained therein at least a part of said methyl mercaptan dissolved in said crude oil, and a stripped crude oil from which said methyl mercaptan has been at least partly selectively removed;

b. cooling said waste gaseous nitrogen, and condensing said part of said methyl mercaptan contained in said waste gaseous nitrogen;

c. separating said condensed part of said methyl mercaptan obtained during step (b), from said waste gaseous nitrogen denuded from said selectively entrained and volatilized methyl mercaptan.

8. A process according to claim 7, wherein the condensed part of said methyl mercaptan, separated during step (c) is further oxidized.

* * * * *